United States Patent [19]
Portier

[11] 3,949,957
[45] Apr. 13, 1976

[54] ACTUATING SYSTEM FOR WING LEADING-EDGE SLATS

[75] Inventor: Serge Portier, Clichy, France

[73] Assignee: Societe Nationale Industrielle Aerospatiale, Paris, France

[22] Filed: Nov. 1, 1974

[21] Appl. No.: 520,421

[30] Foreign Application Priority Data
Nov. 6, 1973 France ............................. 73.39383

[52] U.S. Cl. .......................... 244/42 CA; 244/42 D
[51] Int. Cl.² ......................................... B64C 9/26
[58] Field of Search ......... 244/42 CA, 42 D, 42 CB, 244/42 R, 42 DA, 42 DB

[56] References Cited
UNITED STATES PATENTS

| | | | |
|---|---|---|---|
| 2,776,577 | 1/1957 | Olchawa | 244/42 D X |
| 3,371,888 | 3/1968 | Alvarez-Calderon | 244/42 DB |
| 3,556,439 | 1/1971 | Autry et al. | 244/42 D |

FOREIGN PATENTS OR APPLICATIONS

| | | | |
|---|---|---|---|
| 517,422 | 1/1940 | United Kingdom | 244/42 CA |

*Primary Examiner*—Trygve M. Blix
*Assistant Examiner*—Barry L. Kelmachter
*Attorney, Agent, or Firm*—Karl W. Flocks

[57] ABSTRACT

The invention relates to a leading-edge slat actuating system comprising an intermediate slat having a trailing edge and hingedly connected to a beam fast with the main wing, a front slat hingedly connected to the beam and a leading edge hingedly connected to the front slat, characterized in that the system includes: a first jack having one end hingedly connected to a non-moving point on the wing structure and its other end hingedly connected to a moving point fast with the front slat; two rods on either side of the jack, having their hinge-points located on the one hand on the leading edge of the front slat, in an outer part of the undersurface thereof, and at non-moving points on the beam on the other; a second jack having one end hingedly connected to a non-moving point on the wing structure and its other end hingedly connected to a point moving with the trailing edge of the intermediate slat, the jacks and rods being so arranged that when the jacks are in their extended position the slats are extended to form two slits one of which lies between the intermediate slat and the wing and the other between the front slat and the intermediate slat.

2 Claims, 3 Drawing Figures

ACTUATING SYSTEM FOR WING LEADING-EDGE SLATS

As is well-known to the specialist in the art, in conventionally designed leading-edge slats, the slat geometry is imposed by the basic aerofoil profile and the recompression gradient on a slat can be governed solely by the position of the slat.

U.S. Pat. Nos. 3,524,610 and 3,246,335 (A. Alvarez-Calderon) describe a set of double slotted slats having a very large leading-edge radius yet capable of retracting into the main wing profile without requiring an unduly rearward position for the front mainspar.

These patents show how the slats are integrated into the aerofoil profile and extended forwardly to form a retractable leading-edge slat and a pivoting intermediate slat to provide the wing leading-edge blowing slit.

In accordance with the above-cited patents, the hinge-line for the two slats, which is fast with the main wing, is located at the front part of the intermediate slat and lies in an external rearward area of the undersurface of the front slat, while the common hinge-linge of the two leading-edge and trailing-edge portions of said slat lies in a substantially central part of the undersurface thereof.

In view of the fact that the said patents in reality do no more than situate the interarticulation points of the various wing component parts, the Applicant provides in the present invention actuating mechanisms for extending the slats.

In the present invention, extension of the slats is effected by a number of mechanisms arranged at different points on the main wing. Basically, each mechanism comprises an actuator of which a fixed hinge-line lies at a point on the main wing structure and the other moving hinge-line fast with the front slat lies on the support thereof. Further, two actuating rods on either side of said actuator have their hinge-points located respectively on a portion fast with the leading edge of the front slat and on an external part of the undersurface thereof, on the one hand, and at a fixed point on a beam fast with the main wing and immediately proximate the wing chord.

In addition, each mechanism includes a dependent telescopic actuator for raising the trailing edge of the intermediate slat, which actuator has a fixed hinge-point on a structural part of the wing undersurface and a moving hinge-point on the trailing-edge undersurface of the intermediate slat itself.

The description which follows with reference to the accompanying non-limitative exemplary drawings will give a clear understanding of how the present invention may be applied to an arrangement for extending wing slats in the case of an aircraft of the short takeoff and landing (STOL) type.

Figure 2:
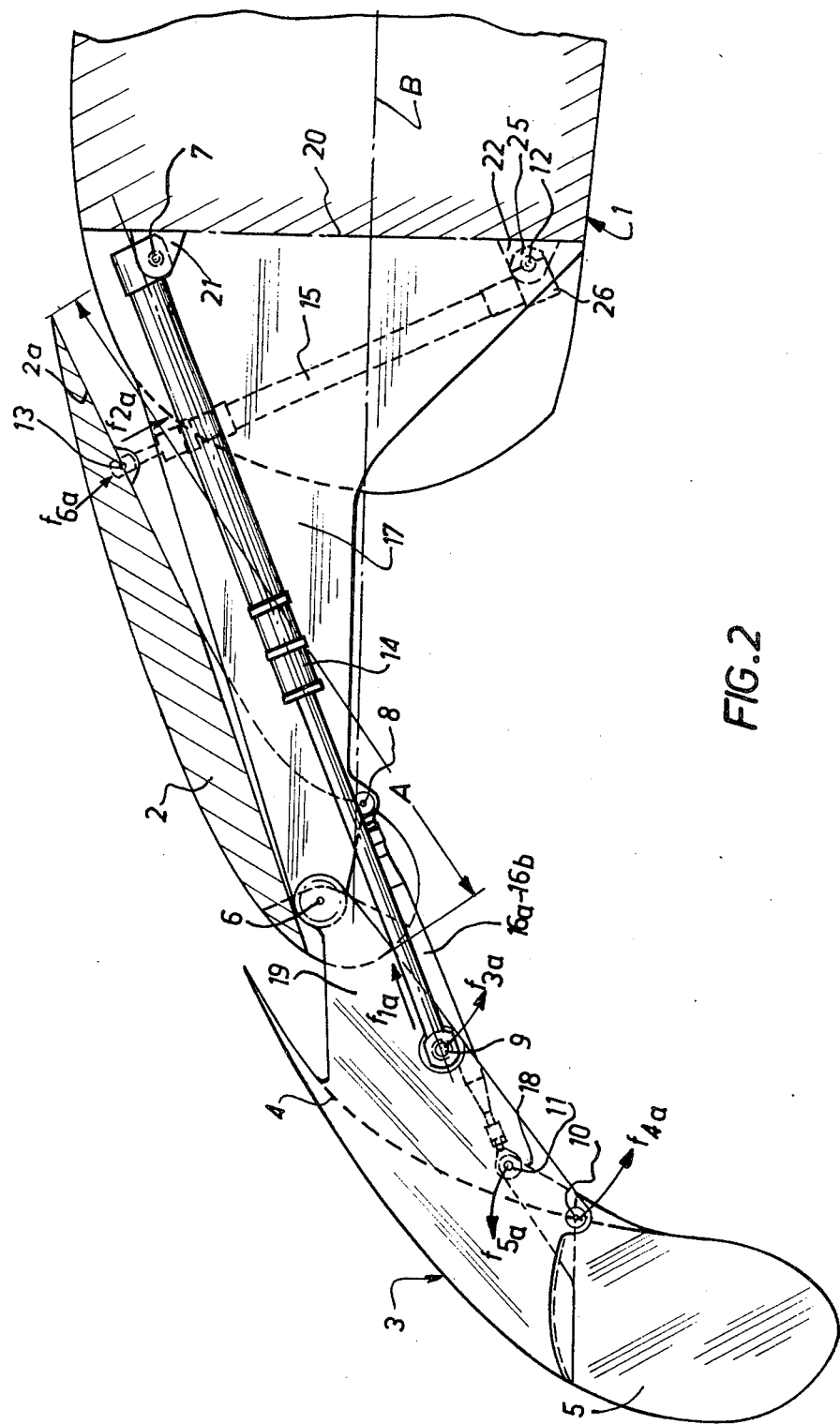
FIG. 2 is a fragmental sectional view on the line II—II in FIG. 1, showing the mechanism in its extended position.
Figure 3:
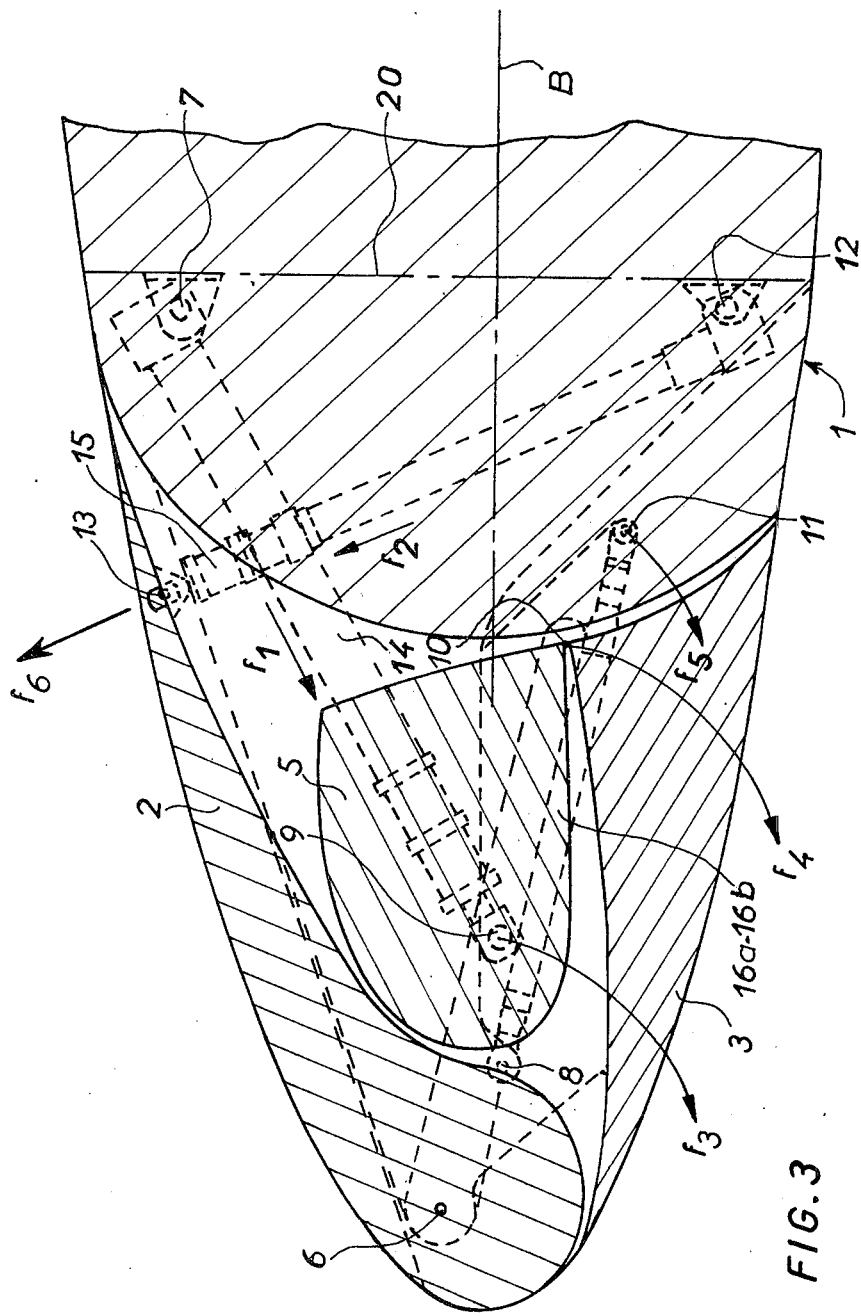
FIG. 3 is a fragmental sectional view on the line III—III in FIG. 1, showing the mechanism in its retracted position.

Reference is first had to FIGS. 2 and 3, from which it may be seen that the drive train of each slat actuating mechanism enables the slats to be retracted into the leading-edge profile of the main wing 1 (see FIG. 3), or to be extended (see FIG. 2). Such motion is possible by reason of the fact that a beam 17 fast with the wing supports a hinge-line 6 common to an intermediate slat 2 having a trailing edge 2a and to a front slat 3, that a jack 14 is hingedly connected to a pin 9 carried on a support 19 fast with said front slat and to a pin 7 supported on the main wing structure 20, and that a hinge-pin 10 common to a portion fast with leading edge 5 and to trailing edge 4 of front slat 3 enables the sections 4 and 5 to retract through the agency of two rods $16_a$–$16_b$ which are connected to a hinge-pin 8 fast with beam 17, immediately proximate the wing chord B, and to a hinge-pin 10.

As will be appreciated from an examination of FIGS. 2 and 3, the extension motion is effected responsively to jack 14. In acting in the direction of $f1$, this jack engenders pivotal motions f3 and f4, and thereafter, under the effect of rods $16_a$, $16_b$, a concurrent pivotal motion $f5$ until the slats are fully extended.

Conversely, the retraction process revealed by FIGS. 2 and 3 occurs responsively to said jack 14 which, in acting in the direction of $f1_a$, engenders pivotal motions in the directions $f3_a$, $f4_a$ and $f5_a$ until the slats have been fully retracted into the main wing profile.

Concurrently, a jack 15 hingedly connected to pins 12 and 13 operates in the direction of $f2$ to cause the intermediate slat to pivot into the open position, and conversely operates in the direction of $f2_a$ to cause said slat to close. The pin 12 is fast with the wing structure and therefore non-moving, whereas the pin 13 is fast with trailing edge 2a of intermediate slat 2 and consequently moves therewith.

Figure 1:
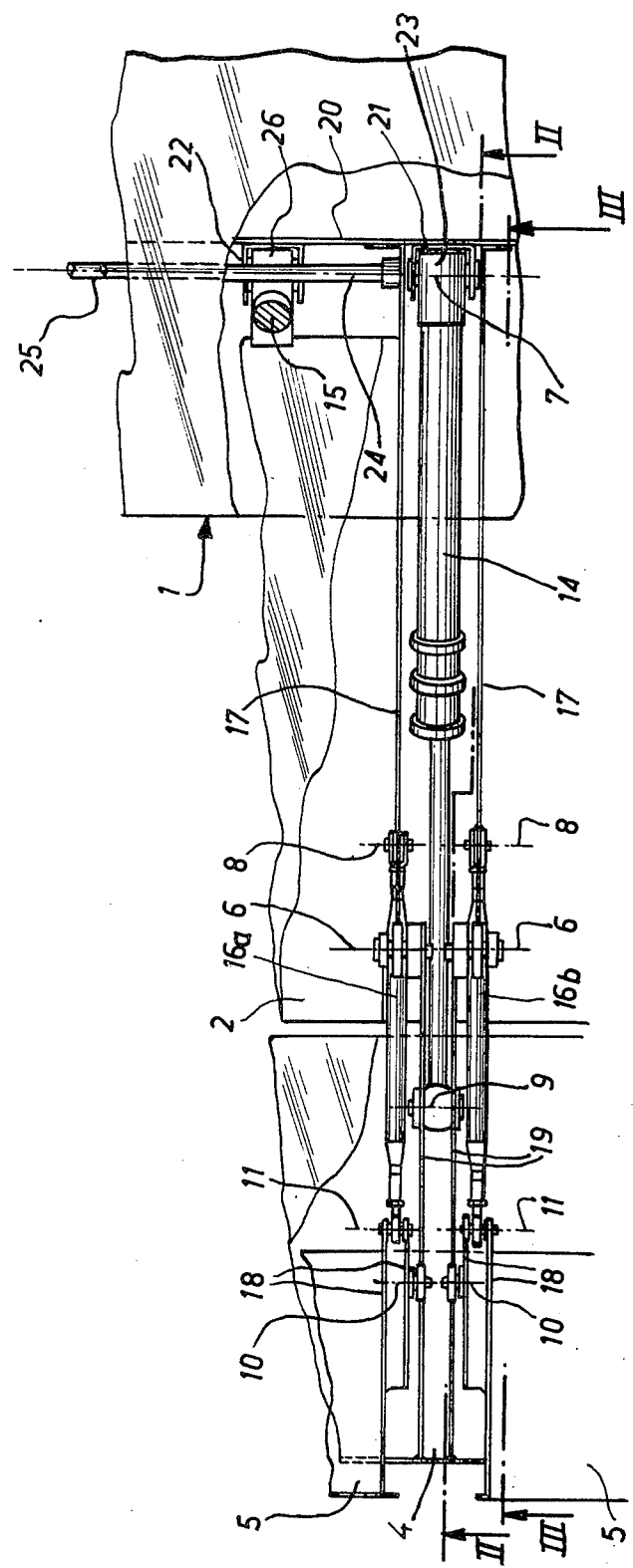
FIG. 1 is a fragmental top view of one of the arrangements forming the extension mechanism of this invention.

From a structural standpoint, an examination of FIG. 1 shows how the various component parts of the subject slat actuating mechanism of this invention are arranged.

In FIG. 1, the webs supporting the bearings have been symbolized by thin metal sheets 17, 18, 19, which do not of course correspond to reality. In point of fact, the structure is based on the integral-structure concept in order to be able to withstand the considerable loads involved, for it should be noted that in the case of a STOL aircraft with an all-up weight of 73 metric tons, the intermediate slat chord referenced A is already 1.37 meters long for a slat length of 7 meters, that the load on said intermediate slat is 700 daN per square meter, and that the loads exerted on each jack, each hinge-point and each rod are 1350 daN, 760 daN and 6600 daN respectively.

The jacks used for the subject mechanism of this invention may be of the "Transrol" screw-jack type, the hinge-points may employ "ADR" type swivel joints, and the rods with vernier adjustment may be of the "SARMA" type. An example of such screw-jacks of the ball and helical track type may be found in U.S. Pat. No. 2,776,577 of OLCHAWA issued Jan. 8, 1957. The screw therein being adapted to be turned through gearing mounted in a housing including worm gear supported in the housing with the gear slidably splined to the gear, turned by a worm which is turned by a control motor or through manual driving means as explained in detail in that patent and in the matter of drive transmitting boxes 23–26 of the present specification.

The jacks are controlled through drive shafts 24–25 operating through drive transmitting boxes 23–26 which are themselves hingedly supported on the wing structure by clevises 21 and 22. A mechanism (not shown) further coordinates the motions of shafts 24 and 25.

A plurality of jacks for extending the forward slats and the intermediate slats may be provided for positioning along the wing structure as required.

Obviously, while the present invention has been described with reference to a leading-edge slat extension and retraction system comprising mechanisms designed to provide specific kinematics, changes and modifications may be made thereto without departing from the spirit and scope of the invention.

I claim:

1. A wing leading-edge slat actuating system comprising a beam fast with the wing, an intermediate slat having a trailing edge and hinged to said beam, a front slat hinged to said beam, and a leading edge hinged to said front slat, characterized in that said system includes a first jack having one end hingedly connected to a fixed point on the wing and a second end hingedly connected to a moving point fast with said front slat and placed substantially at middle distance on a line drawn from a hinge point common to said front slat and said leading edge and reaching a trailing edge of said front slat; two rectilinear rods on either side of said jack having their hinge-points respectively located, on the one hand, at points fast with said leading edge which is fair shaped and on an outer part of the undersurface thereof, and at fixed points on said beam on the other; a second jack having a fixed hinge-point on the wing and a moving hinge-point on said intermediate-slat trailing edge; said jacks and rods being so arranged that when said jacks are in their extended position said slats are extended and form two slits, one of said slits between said intermediate slat and said wing and the other slit between said front slat and said intermediate slat, it being possible for said slits to be masked for certain flight configurations such that when said jacks are in their retracted position said slats have been retracted by pivotal motion and blend completely with the leading-edge profile.

2. A wing slat actuating system in accordance with claim 1 further characterized by
    said jacks being screw-jacks of the ball and helical tract type,
    and intermediate gearboxes pivotally connected to the aircraft wing,
    and drive shafts for driving said jacks through said gearboxes.

* * * * *